(No Model.)
2 Sheets—Sheet 1.
M. S. CONLY.
ABSORBER FOR AMMONIA ICE MAKING APPARATUS.
No. 297,502. Patented Apr. 22, 1884.
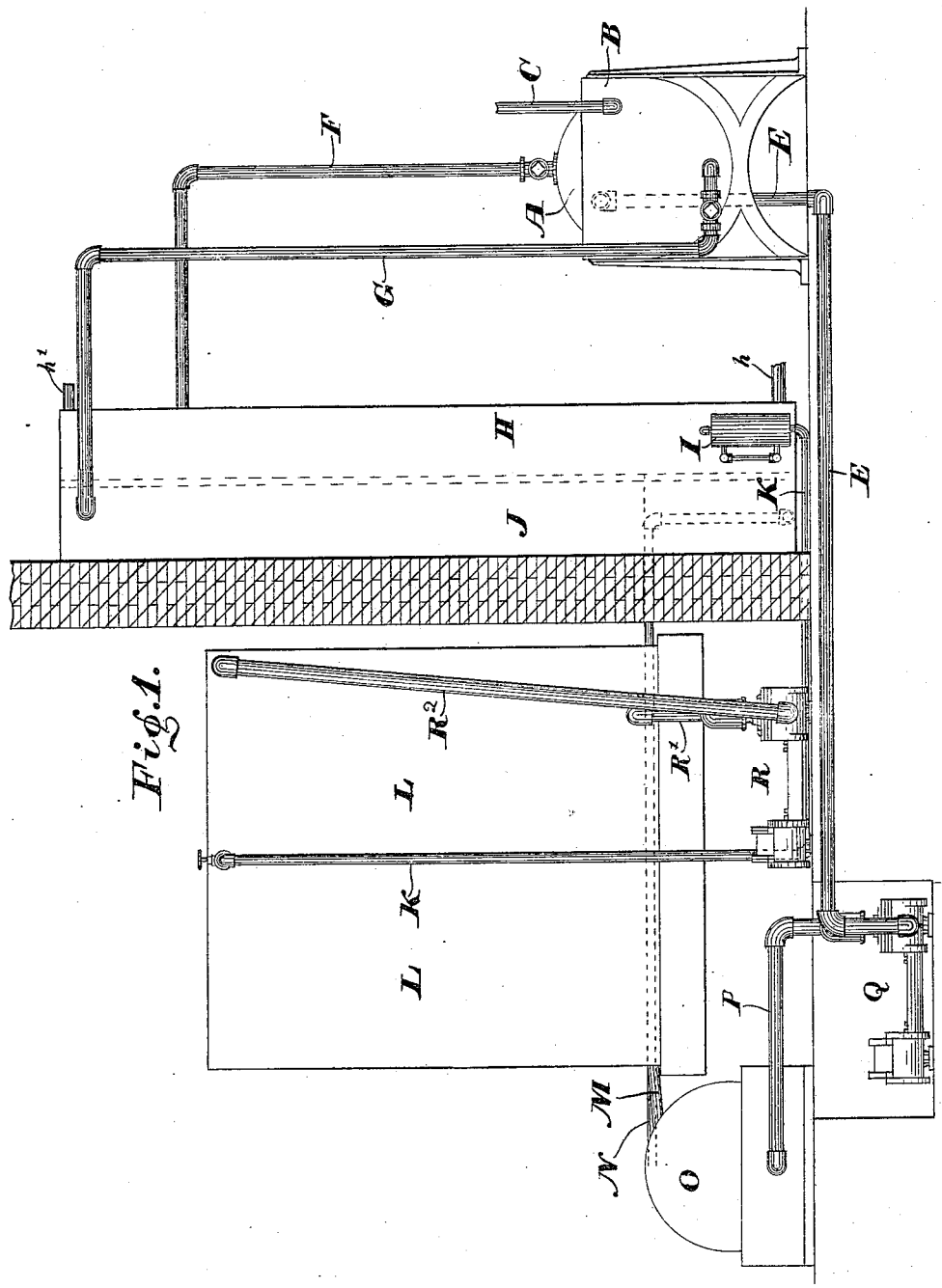
WITNESSES.
Chas. N. Leonard.
E. W. Bradford.
INVENTOR.
Mahlon S. Conly,
PER
C. Bradford,
ATTORNEY.

(No Model.) 2 Sheets—Sheet 2.
M. S. CONLY.
ABSORBER FOR AMMONIA ICE MAKING APPARATUS.
No. 297,502. Patented Apr. 22, 1884.
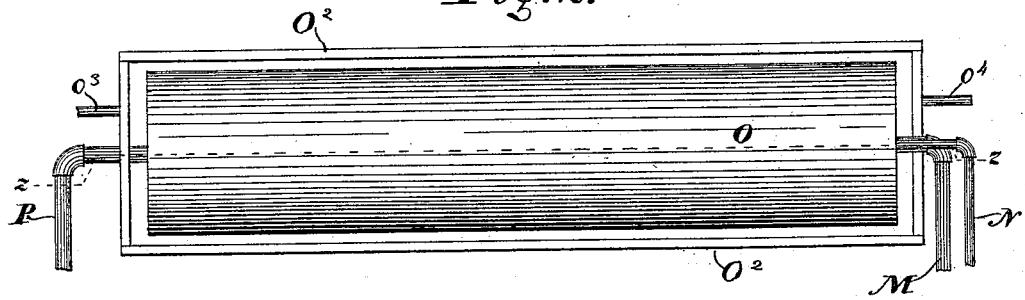
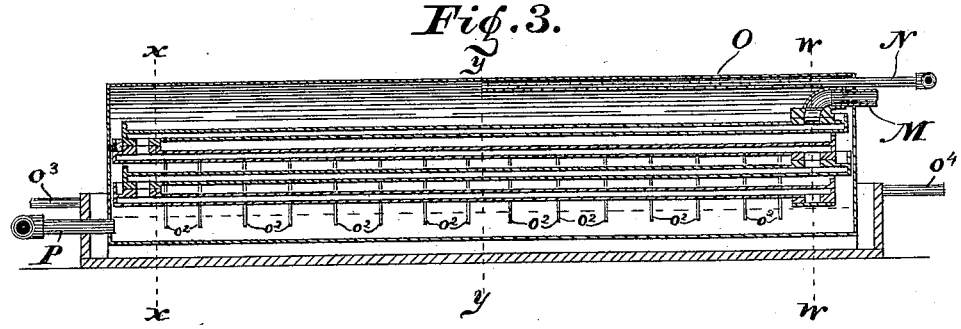
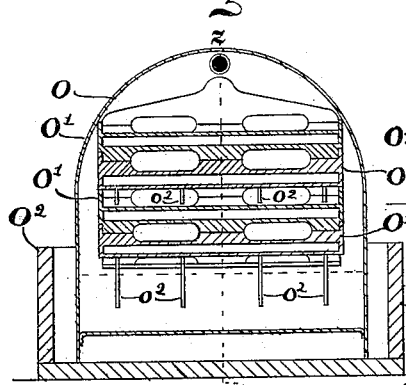
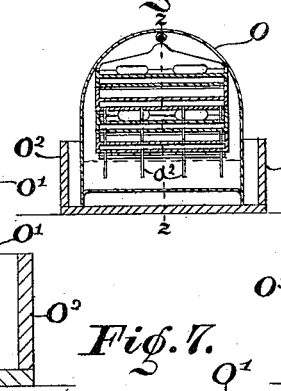
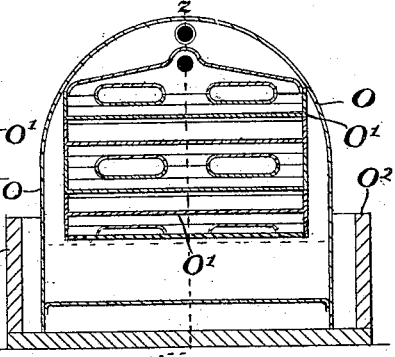
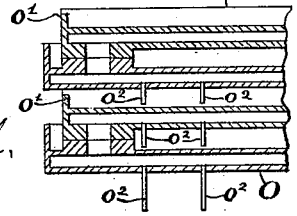
WITNESSES.
Chas. N. Leonard.
E. W. Bradford.
INVENTOR.
Mahlon S. Conly,
PER
C. Bradford,
ATTORNEY.

UNITED STATES PATENT OFFICE.

MAHLON S. CONLY, OF INDIANAPOLIS, INDIANA, ASSIGNOR OF TWO-THIRDS TO THOMAS H. BUTLER AND ORANGE R. WEAVER, BOTH OF SAME PLACE.

ABSORBER FOR AMMONIA ICE-MAKING APPARATUS.

SPECIFICATION forming part of Letters Patent No. 297,502, dated April 22, 1884.

Application filed August 10, 1883. (No model.)

*To all whom it may concern:*

Be it known that I, MAHLON S. CONLY, of the city of Indianapolis, county of Marion, and State of Indiana, have invented certain new and useful Improvements in Absorbers for Ammonia Ice-Making Apparatus, of which the following is a specification.

The general process of forming ice by the use of ammonia, and which consists, essentially, in producing in a "retort" ammonia-gas from liquid ammonia or ammonia and water, passing the same through a cooler, and thereby condensing it, then passing it through a series of large pipes in the "refrigerator," where it expands and absorbs heat, and, finally, passing it into an "absorber," where it is taken up by water and put in condition to be again passed into the retort and through the same process, is no part of my present invention, and will not be further described herein.

My present invention relates to the construction, arrangement of parts, and method of using that portion of the apparatus known as the "absorber;" and it consists in a series of shallow hollow-bottomed troughs arranged one above another, and connected in such a manner that the hollow space in the bottom of each communicates with that of the adjoining pan or pans.

It further consists in arranging and connecting the said troughs so that a liquid running into the top one will pass along or over all the rest in the series.

It further consists in connecting the hollow bottoms of each (except the top one) with the top of the one next below, or with a space underneath it, by means of a series of fine pipes, all as will be presently more fully described.

Referring to the accompanying drawings, which are made a part hereof, and on which similar letters of reference indicate similar parts, Figure 1 is a side elevation of a complete apparatus for producing ice; Fig. 2, a top plan of the absorber and its connections; Fig. 3, a longitudinal vertical section of the same on the dotted line *z z*; Fig. 4, a transverse vertical sectional view, looking to the right from the dotted line *y y*; Fig. 5, a similar view, on an enlarged scale, looking to the right from the dotted line *x x*; Fig. 6, a similar view, looking to the right from the dotted line *w w*; and Fig. 7, a detail view, showing a portion of Fig. 3 on an enlarged scale.

In said drawings, the portions marked A represent the shell of the retort; B, a casing surrounding the same; C, the hot-water inlet; D, the hot-water outlet; E, the aqua-ammonia-inlet pipe; F, the ammonia-gas outlet; G, the weak-aqua-ammonia outlet; H, the condenser for the ammonia-gas; I, the liquid-gas reservoir; J, the cooler for the weak aqua-ammonia; K, a pipe leading from the liquid-gas reservoir to the refrigerator; L, said refrigerator; M, a pipe leading from the refrigerator to the absorber; N, a pipe leading from the cooler J to the absorber; O, said absorber; P, a pipe leading from said absorber to a force-pump; Q, said force-pump, which draws the aqua-ammonia from the absorber through pipe P and forces it to the retort through pipe E; and R, a "circulation-pump" attached to the refrigerator by pipes R' R², which is for the sole purpose of keeping the salt-water therein in circulation.

The absorber O is composed of an outer shell containing the series of hollow-bottomed troughs O', and set in a trough or water-box, O². The weak aqua-ammonia, after leaving the retort, is passed through the cooler J, and its temperature reduced to about the ordinary temperature of cold water—say about 60° Fahrenheit. It then enters the absorber through the pipe N, which extends some distance into the absorber, and the inner end of which has numerous small perforations therein, thus distributing said weak aqua-ammonia at once over a large portion of the surface of the top trough of the series, and in which its depth is not intended to exceed one-half an inch. From the first trough the weak ammonia flows over the low end *o'* to the second, then to the third, and so on until it is finally deposited in the bottom of the absorber. The cold ammonia-gas, in leaving the refrigerator, enters the absorber by way of the pipe M, which communicates (preferably through several mouths, as shown) with the hollow bottom of the top trough of the series. This gas, after performing its labor of taking up a portion of the latent heat of the contents of the refrigerator, is still of a very low temperature when working to the best advantage—say about 25° Fahrenheit. It being understood that the operation of charging the water or weak aqua-ammonia with gas can be accomplished more rapidly and efficiently as the temperature of the two is brought nearer together, it will be seen that any means which will lower the temperature of the water and raise that of the gas will cause a more efficient working of the apparatus. I accomplish this result by means of the series of hollow-bottomed troughs described, in which the water and gas are only divided by the thin metal false bottom of the troughs. As a further step in this direction, I provide numerous small pipes, $o^2$, which pass through the lower bottoms of the troughs into the chambers between said lower bottoms and the false bottoms into which the gas is flowing, and which extend downward and far enough to nearly touch the bottom of the next trough below, and in the lowest trough of the series extending about half-way down to the bottom of the outer shell. The gas, in its passage through the chambers formed in the bottoms of these troughs, will escape in numerous small quantities through these pipes into the weak aqua-ammonia and be absorbed thereby, and is finally, by the time it has reached the end of the chamber in the lower trough, all taken up. By this time, also, the temperature has become equalized, and as in the process of absorption heat is evolved, the temperature has also been raised to a considerably higher degree than the average temperature of the gas and weak aqua-ammonia at the time they entered the absorber. To carry away this heat, a constant stream of cold water is passed under and around the absorber, through the water-box $O^2$, entering through the pipe $o^3$, and passing out through the pipe $o^4$.

Having thus fully described my said invention, what I claim as new, and desire to secure by Letters Patent, is—

1. An absorber for ammonia-gas, consisting of an outer shell and a series of hollow-bottomed troughs therein, the ammonia-gas being conducted through the several chambers formed by the hollow bottoms, and the weak aqua-ammonia or water being conducted through the troughs over the bottoms thereof, which also constitute the tops of said chambers, substantially as set forth.

2. In an absorber or device for charging water or weak aqua-ammonia with ammonia-gas, a series of hollow-bottomed troughs, the trough portions of which are adapted to contain the water or weak aqua-ammonia, and the hollow bottoms or chambers of which are adapted to contain the ammonia-gas, provided with a series of small pipes, which extend from said chambers to the bottoms of the troughs next below them, substantially as set forth.

3. The combination of the shell O, the series of hollow-bottomed troughs therein, the inlet-pipes M and N, and the outlet-pipe P, substantially as described, and for the purposes specified.

In witness whereof I have hereunto set my hand and seal, at Indianapolis, Indiana, this 4th day of August, A. D. 1883.

MAHLON S. CONLY. [L. S.]

In presence of—
C. BRADFORD,
E. W. BRADFORD.